United States Patent [19]

Livingston et al.

[11] Patent Number: 5,509,788
[45] Date of Patent: Apr. 23, 1996

[54] FLOW-METERED PUMPING WITH LOAD COMPENSATION SYSTEM AND METHOD

[75] Inventors: James W. Livingston; Stephen Hosking, both of Santa Cruz, Calif.

[73] Assignee: Diversey Corporation, Canada

[21] Appl. No.: 515,750

[22] Filed: Aug. 16, 1995

Related U.S. Application Data

[63] Continuation of Ser. No. 127,162, Sep. 27, 1993.

[51] Int. Cl.⁶ .................................................. F04B 49/00
[52] U.S. Cl. ............................... 417/43; 417/42; 417/53; 222/651
[58] Field of Search ........................ 417/12, 22, 42, 417/43, 44, 53, 307, 384; 388/811, 815, 902; 222/651

[56] References Cited

U.S. PATENT DOCUMENTS

| | | | |
|---|---|---|---|
| 2,137,928 | 11/1938 | Tangueray | 222/651 |
| 2,197,294 | 4/1940 | Brockbank | 222/651 |
| 3,771,333 | 11/1973 | Jurjans | 222/651 |
| 3,976,926 | 8/1976 | Egbert | 388/811 |
| 4,209,258 | 6/1980 | Oakes . | |
| 4,241,299 | 12/1980 | Bertone | 417/22 |
| 4,384,825 | 5/1983 | Thomas et al. . | |
| 4,413,212 | 11/1983 | Okamoto et al. | 388/811 |
| 4,552,513 | 11/1985 | Miller et al. . | |
| 4,661,750 | 4/1987 | Mori | 388/811 |
| 4,712,853 | 12/1987 | Howard | 388/815 |
| 5,141,402 | 8/1992 | Bloomquist et al. . | |
| 5,163,818 | 11/1992 | Betsill et al. . | |
| 5,262,068 | 11/1993 | Bowers et al. | 417/384 |
| 5,348,448 | 9/1994 | Ikemoto et al. | 417/42 |

FOREIGN PATENT DOCUMENTS

| | | | |
|---|---|---|---|
| 2455598 | 5/1976 | Germany | 417/42 |
| 0056693 | 4/1982 | Japan | 417/22 |
| 0086493 | 5/1984 | Japan | 388/902 |
| 0029778 | 2/1987 | Japan | 417/22 R |
| 405248363A | 9/1993 | Japan | 417/42 |
| 000478888 | 4/1992 | WIPO | 222/651 |

*Primary Examiner*—Richard A. Bertsch
*Assistant Examiner*—Xuan M. Thai
*Attorney, Agent, or Firm*—Flehr, Hohbach, Test, Albritton & Herbert

[57] ABSTRACT

The present invention is an improved flow-metered pumping system using an air-backed diaphragm pump with load compensation. A variable motor speed controller is used to compensate for flow rate reduction caused by pressure effects. When the output pressure on the pump increases to a point where the load on the pump motor exceeds a specified threshold, the motor speed controller increases the speed of the motor to compensate for pressure induced diaphragm distortion losses and to achieve a substantially constant flow rate across a range of pump output pressures.

10 Claims, 4 Drawing Sheets

FLOW-METERED PUMPING WITH LOAD COMPENSATION SYSTEM AND METHOD

This is a continuation of application Ser. No. 08/127,162 filed Sep. 27, 1993.

The present invention relates generally to metered pumping systems, and particularly to a constant flow pumping system using air-backed diaphragm pumps.

BACKGROUND OF THE INVENTION

Air-backed diaphragm pumps provide an economical and reliable solution for many fluid handling applications. However, they are not suitable for use in a system where a precise or highly stable flow rate is required. The flow rate of such pumps drops with increasing pressure on the pump outlet for several reasons. First, the increased load slows the motor down resulting in a reduced flow rate. Second, the unsupported regions of the pump diaphragm balloon slightly in proportion to the pressure on the outlet, reducing the effective displacement and flow rate of the pump. These diaphragm distortion-based flow rate losses are independent of motor type.

While load induced motor speed reductions can be compensated by using control techniques well known in the art, such correction techniques only counteract about 70% of pressure induced flow rate losses. These techniques do not compensate for diaphragm distortion-based flow rate losses which can account for up to 30% of the pressure induced flow reduction.

One method of eliminating the distortion based diaphragm flow rate loss is to support the diaphragm with some incompressible liquid in a sealed chamber behind the diaphragm. However, such liquid-backed pumps are inefficient and relatively expensive compared to air-backed pumps. Alternatively, a rotor vane pump can be used instead of a diaphragm pump. A rotor vane pump can accurately maintain a specified flow rate through varied outlet pressures. However, rotor vane pumps are very expensive. Moreover, rotor vane pumps cannot pump fluids containing large particulates (>50 micron) and as a result require the use of micro filters to screen any fluid that is pumped. Air-backed diaphragm pumps, on the other hand, are inexpensive and can pump fluids with relatively large particulates without impairing the pump.

An object of the invention is to provide a low cost metered flow pumping system that provides substantially constant flow rate across a range of pump output pressures.

Another object of the present invention is to provide a metered flow pumping system that is not sensitive to the presence fluid particulates.

Another object of the invention is to provide a metered flow pumping system using an air-backed diaphragm pump.

SUMMARY OF THE INVENTION

In summary, the present invention is an improved flow-metered pumping system using an air-backed diaphragm pump with load compensation. A variable motor speed controller is used to compensate for flow rate reduction caused by pressure effects. The load on the motor driving a diaphragm pump increases in proportion to the pressure on the output of the pump. This load is measured and used in a feedback loop to increase the speed of the motor. The gain of this feedback loop is set at such a level as to compensate for pressure induced diaphragm distortion losses and to achieve substantially constant flow rate across a range of pump output pressures.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
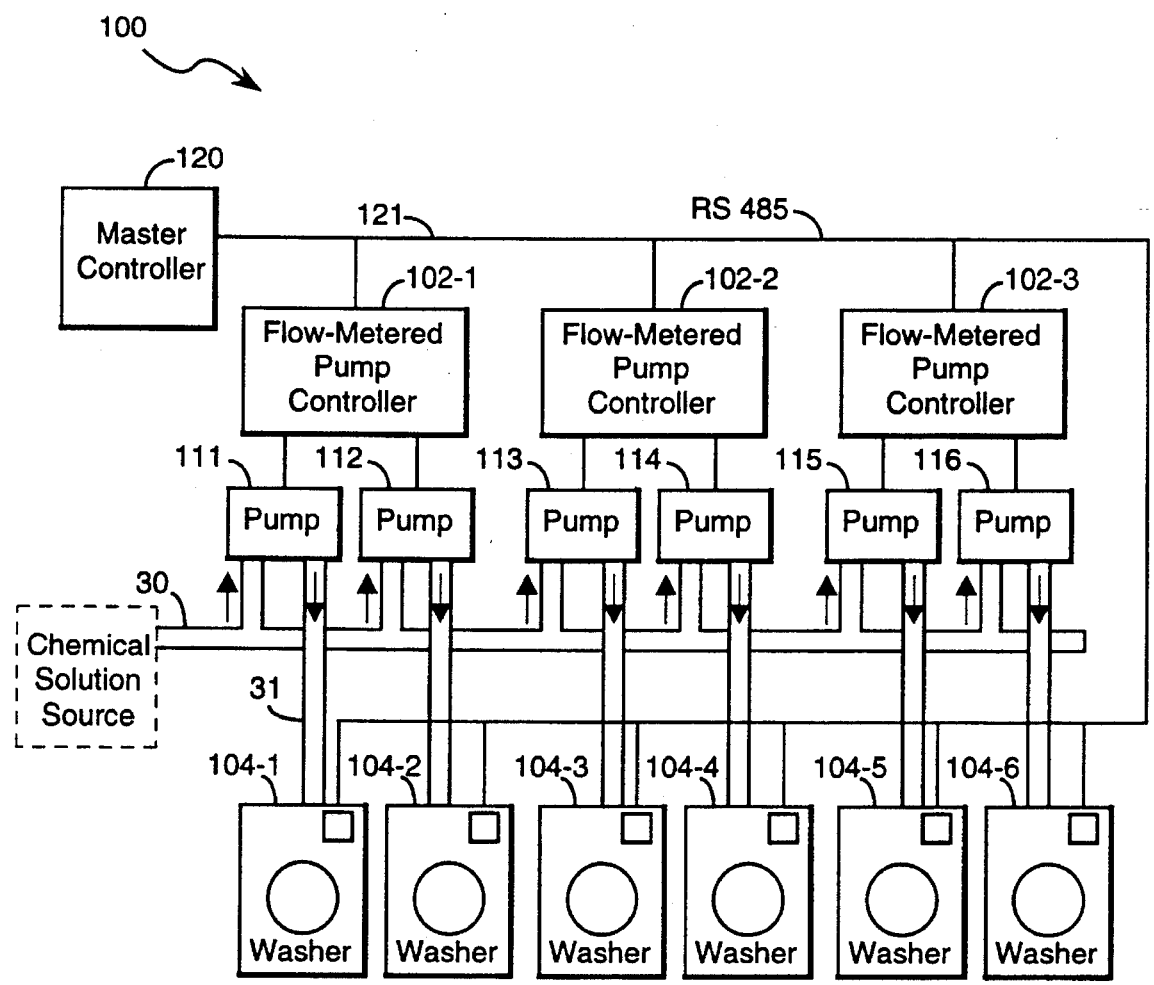
FIG. 1 is a block diagram of a washing machine system that uses the flow-metered pumping system of the instant invention to provide a constant flow rate of chemical solution to the washing machines.

FIG. 1 shows a washing machine system 100 utilizing metered flow pump controllers 102-1, 102-2, 102-3 of the present invention. The washing machine system includes washing machines 104-1 to 104-6 which receive chemical solution pumped at a measured flow rate by pumps 111–116. These metered-flow pumps are controlled by metered flow pump controllers 102-1 to 102-3. Each pump controller 102 can control up to two pumps. Each of the two pumps attached to one controller can feed a separate washer or they both can be attached to a single washer to provide double the maximum flow of solution to that washer. Washer 104-1 is shown connected to a single pump 111, which is one of two pumps controlled by metered flow controller 102-1. Pump 111 draws chemical solution from main conduit 30 and delivers the solution to washer 104-1 via feed conduit 31. Other washers in the system are connected to the pumps and main conduit in a similar manner.

Master controller 120 coordinates the various subsystems of the washing machine system. It communicates to the pump controllers and washing machines over serial connection line 121. In the instant embodiment, this serial connection is implemented using a RS 485 communication protocol. The master controller 120 specifies desired flow rates to the metered-flow pump controllers 102 over serial connection line 121.

Figure 2:
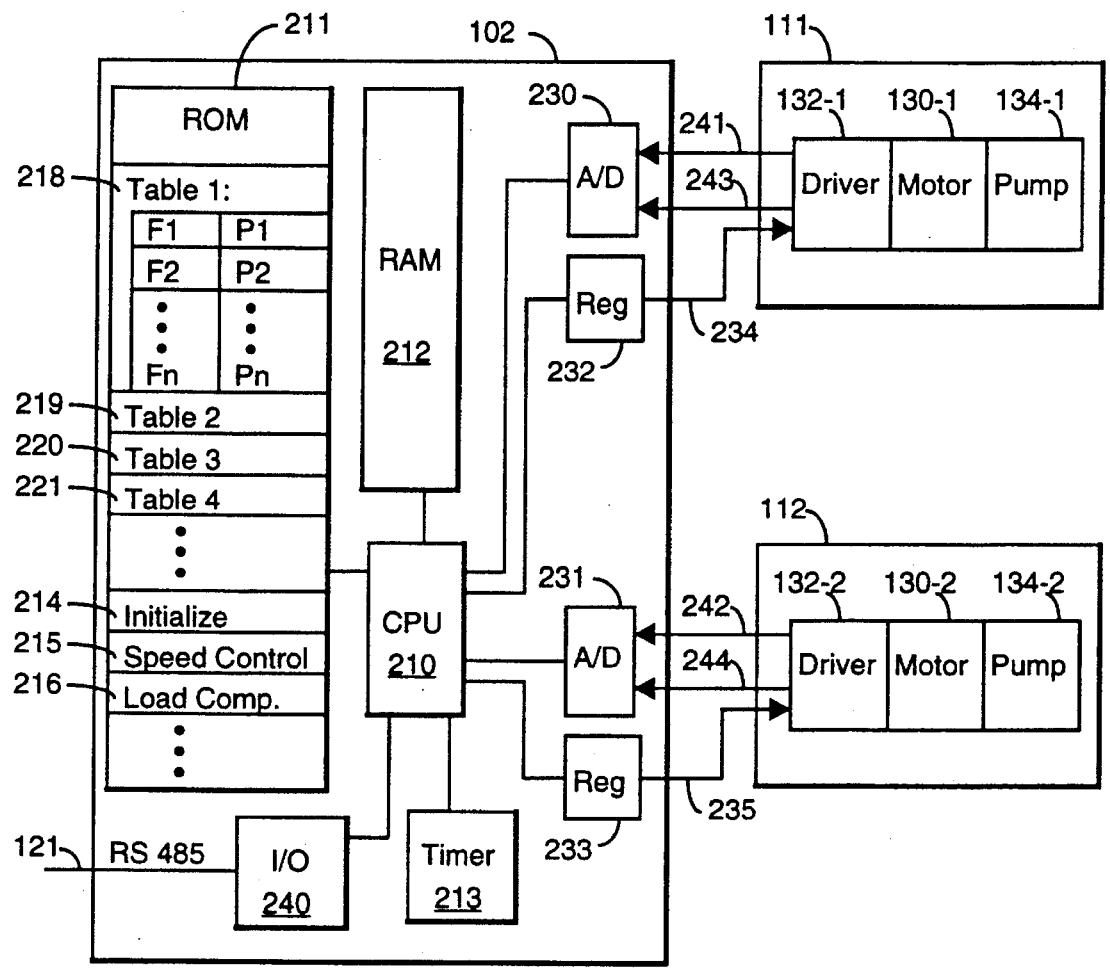
FIG. 2 is a block diagram of the flow-metered pumping system of the instant invention.

FIG. 2 shows the metered flow pumping system of the instant invention including the controller 102, and two pumps 111, and 112. The instant invention has the capability to independently regulate two pumps but can be operated to control a single pump or multiple pumps without departing from the scope of the invention. Each pump 111, 112 consists of a pulse controlled permanent magnet DC motor 130, motor driver 132, and an air-backed diaphragm pump 134. The motor drivers 132 deliver power to motors 130 according to the signals on pulse length modulation (PLM)

signal lines 234, 235 which are output from the controller 120.

The controller 102 consists of a CPU 210 which executes software stored in a ROM 211 in conjunction with a RAM 212 for manipulating controller hardware to perform control functions. The ROM 211 stores control programs 214–216 and data tables 218–221. The data tables hold parameters used by the controller software in controlling the pump motors. The controller also has a timer 213 for scheduling the execution of control functions. A-D converters 230, 231 translate analog signals from the pump motors into digital values that are used by the CPU 210. The controller has output port registers 232 and 233 connected to PLM signal lines 234, 235. The CPU 210 writes to these registers to control the PLM signal lines 234, 235. Finally, the controller has I/O interface 240 sending and receiving messages to and from an outside source using the RS 485 communication protocol. In the preferred embodiment, all of the controller elements are contained within a 68HC705B5 single chip micro-controller, but they can be built using discreet components without departing from the scope of the invention. Other micro-controllers, preferably with built-in analog to digital converters, could be used in alternate embodiments.

The controller software 214–216 instructs the CPU 210 to calculate the amount of time that the PLM signals output on lines 234, 235 should be ON in a given cycle according to the control algorithms discussed below. The CPU 210 programs the timer 213 to generate a signal at the specified time interval. The CPU 210 writes a high value to the output port corresponding to a PLM signal to turn on that PLM signal and writes a low value to the same output port to turn off the PLM signal when the timer 213 indicates that the specified time has elapsed.

The PLM signals are periodic (8.192 ms cycle time in the instant embodiment) and control power to the pump motor. When a PLM signal is high the motor is supplied with power that causes acceleration. When the PLM signal is low the power is cut off and the motor coasts. The speed of a motor can be controlled by adjusting the duty cycle of the PLM signal. The more that the signal is "on" during a cycle, the faster the motor will rotate.

Figure 3:
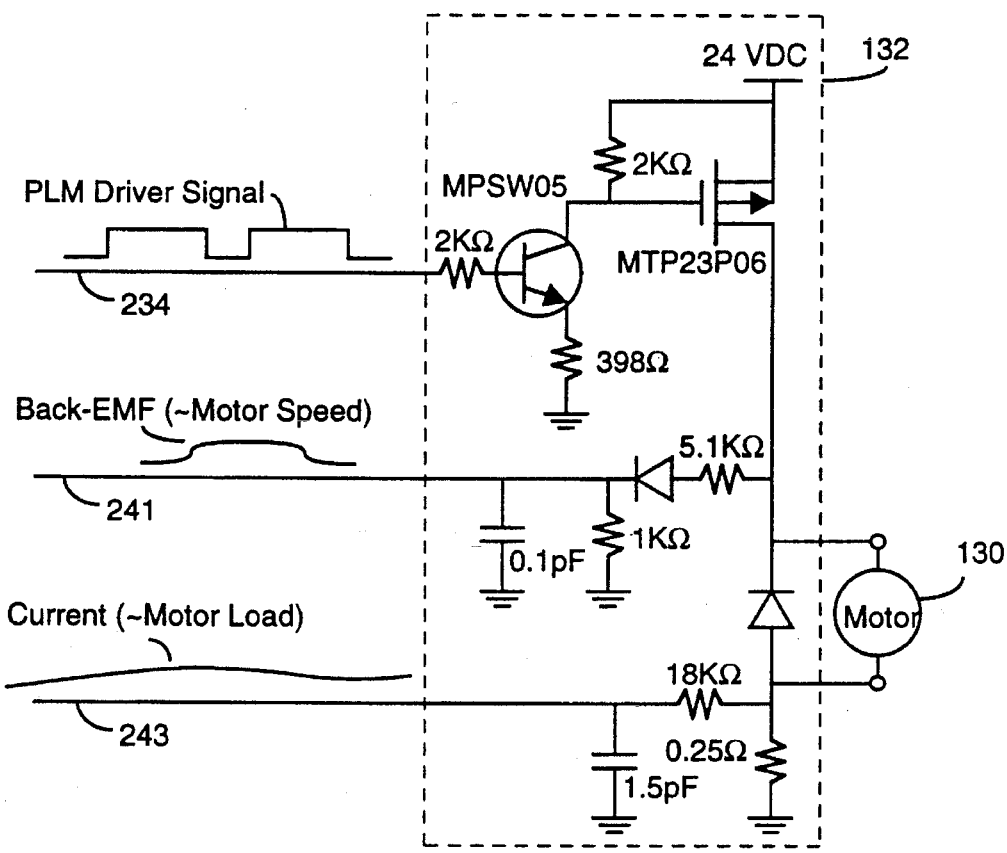
FIG. 3 depicts a pump motor drive circuit and the drive and measurement signals associated therewith.

Referring to FIGS. 2 and 3, each motor provides the controller with two sense signals. The motor back-emf signals received on lines 241, 242 are used by the controller as a measure of motor speed. Motor speed can be measured by other means such as an encoder or tachometer without departing from the scope of the invention. The motor current signals received on lines 243 and 244 are used by the controller as an indication of the load on each motor. Motor loading can also be measured by other means such as a torque or pressure sensor without departing from the scope of the invention.

The measurement of the back-emf signal is synchronized with the PLM drive signal. The controller software reads the back-emf signal at the end of the PLM drive cycle just before the PLM signal is turned on for the next drive cycle. This timing allows the measurement of a motor's back-emf without interference from the PLM drive signal. The timing of the motor current signal is not critical. In the instant embodiment, the motor current is read in the middle of the PLM cycle but can be read at other points in the PLM drive cycle without effecting the operation of the invention.

Figure 4:
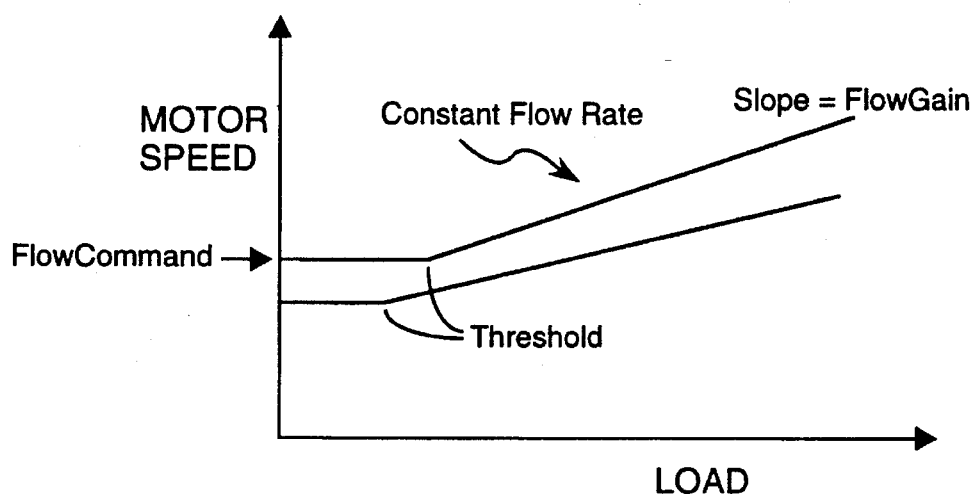
FIG. 4 depicts a graph showing the motor speed for an air-backed diaphragm pump needed to maintain a constant flow rate for a range of motor loads.

FIG. 4 depicts a motor speed and motor load graph that shows relationship between motor speed and motor load for an air-backed diaphragm pump for two different flow rates. As shown, in order to maintain a constant flow rate through the pump, as the load (i.e., output pressure) on the pump increases past a threshold load, the motor speed must be increased in order to maintain a constant flow rate. Also shown in FIG. 4 is that the threshold load is different for different flow rates and that different positive feedback gains are needed to maintain different flow rates.

Figure 5:
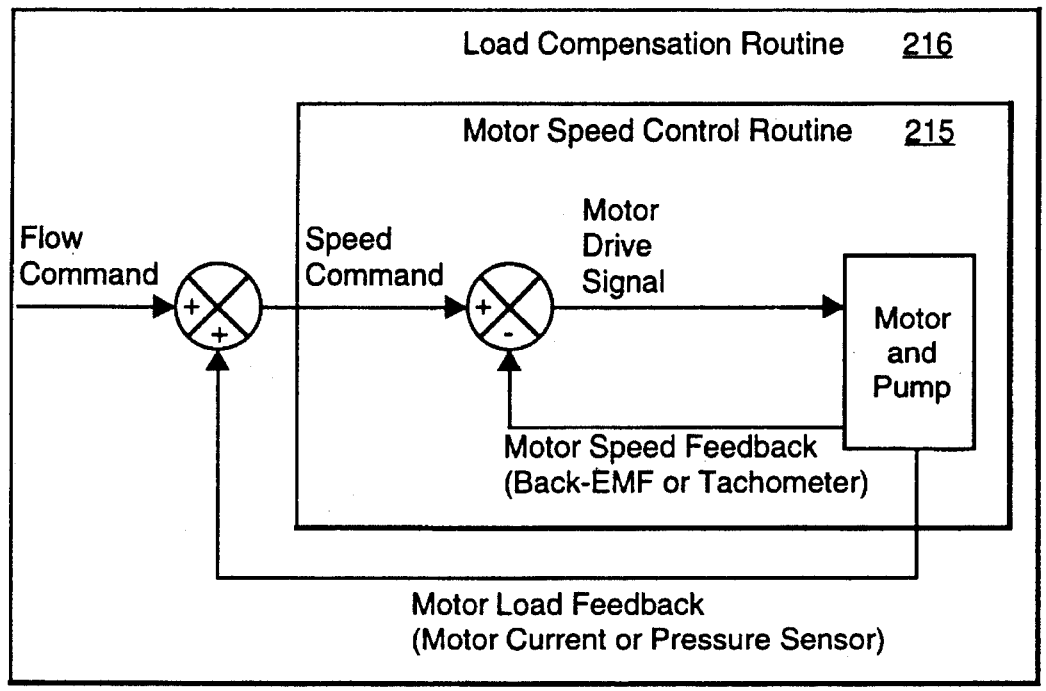
FIG. 5 is a flow chart for a dual control loop to maintain a constant flow through an air-backed diaphragm pump.

FIG. 5 shows the feedback control system implemented by the controller 210. The controller uses a dual feedback loop system to control the flow rate through the motor. The controller 210 executes a first motor speed feedback routine 215 to control motor speed. The controller uses a specified Speed Command value as the target motor speed. It gets a back-EMF signal from the motor that is proportional to motor speed. The timer is used to signal the controller when to read the back-EMF signal. The A-D converters am used to convert the analog back-emf signal into a digital signal for manipulation by the CPU. The controller uses the digital conversion of the back-EMF signal and speed command value to select the duty cycle for the PLM signal. An error value proportional to the difference between the actual speed (as reflected by the digitized back-EMF signal) and the speed command value is generated by the controller. The change in the PLM signal duty cycle is determined by multiplying the error by a proportional gain signal and adding the integral of the error with respect to time multiplied by an integral gain value. This change value is added to a "steady state" PLM duty cycle value that is determined by multiplying the speed command value by an initial gain. The following pseudocode shows the operation of the controller software implementing the first feedback loop:

```
Speed Control
{
Receive Back_emf
error = SpeedCommand - Back_emf
accum = accum + (error * IntegralGain)
clip accum to predefined range
temp =    (SpeedCommand * InitialGain) +
          (error * ProportionalGain) + accum
clip temp to predefined range
PLM duty cycle = temp
-- controller will continue to drive motor with this computed
-- PLM duty cycle until this value is updated
}
```

This routine is executed once during each PLM drive cycle after the back-emf has been read.

The control software includes a second feedback loop routine 216 to adjust the speed command value used by the first feedback loop to compensate for diaphragm distortion-induced flow rate losses at high output pressures. The controller receives an externally sourced flow command value over the RS 485 link that specifies the target flow rate through the pump. The flow command value in the preferred embodiment is actually a base pump speed value which will achieve a desired flow rate if the load on the pump motor is very low.

The controller gets a motor current signal from the motor that is proportional to the load on the motor. The controller uses the motor current and flow command value to select an appropriate speed command value. The motor current is compared to a threshold value. If the motor current is greater than the threshold, the difference between the motor current and the threshold is multiplied by a flow gain and added to the flow command value to generate a new speed command value for the motor speed feedback routine 215. As the load increases, the speed command value is increased to compensate for throughput losses caused by pressure effects. The following pseudocode shows the operation of the controller software implementing the second control loop:

```
Load Compensation
{
Receive MotorCurrent
if MotorCurrent > Threshold then
    {
    SpeedCommand = FlowCommand +
    ((MotorCurrent - Threshold) * FlowGain)
    }
else SpeedCommand = FlowCommand
```

-continued
```
Return
}
```

The positive feedback gain coefficient, FlowGain, in this routine is computed from flow and speed measurements of actual air-backed diaphragm pumps so that the flow rate of fluid through the pump remains substantially constant for a specified range of output pressures or motor loads. This routine is executed once during each PLM cycle just after the motor current signal has been read.

Each time a new flow command value is received over the RS 485 port the CPU 210 executes an initialization routine 213. The initialization routine selects values for the flow gain, proportional gain and integral gain, and motor current threshold using the data tables 218–221. There is a separate table for each of these parameters. Each table consists of a sequence of flow rate/value pairs. The value paired with a flow rate is the optimized parameter value corresponding to that flow rate. These pairs are stored in the table in sequence of increasing flow rates. The initialization routine scans the table starting at the highest flow rate and locates the largest flow rate that is less than or equal to the new flow command. The parameter is initialized to the value corresponding this located flow rate. Using a parameter lookup table indexed according to flow rate allows the controller software to be optimized for broad range of flow rates. In the preferred embodiment, the parameters can also be down-loaded over the serial link, allowing the master controller to optimize the control software for certain situations.

The initialization routine then ramps the motor speed up or down to the desired flow rate by increasing or decreasing speed command value by a constant amount each cycle until the target motor speed is reached. Once up to speed, the initialization routine then enables the dual loop control algorithm to control speed and compensate for load, The following pseudocode shows the flow of the initialization routine:

```
Initialize
{
Receive FlowCommmand
if FlowCommand is New
    {
    Threshold = ThresholdTable(FlowCommand)
    FlowGain = GainTable(FlowCommand)
    InitialGain = InitGainTable(FlowCommand)
    ProportionalGain = PropGainTable(FlowCommand)
    Ramp SpeedCommand up or down
        until SpeedCommand = FlowCommand
    }
Return
}
ThresholdTable(FlowCommand)
    -- Note structure of Threshold table is
    -- Table(Flow(1:N),Threshold(1:N))
    Index = 1
    Do For Index = 1 to N
    {
        If Flow(Index) ≦ FlowCommand {
            Return (Threshold(Index)) }
    }
    Return (Threshold(N))
    -- The FlowGain, InitialGain and ProportionalGain functions all
    -- work in the same way as the ThresholdTable function, except
    -- that the flow value breakpoints may be different in each table.
```

Figure 6:
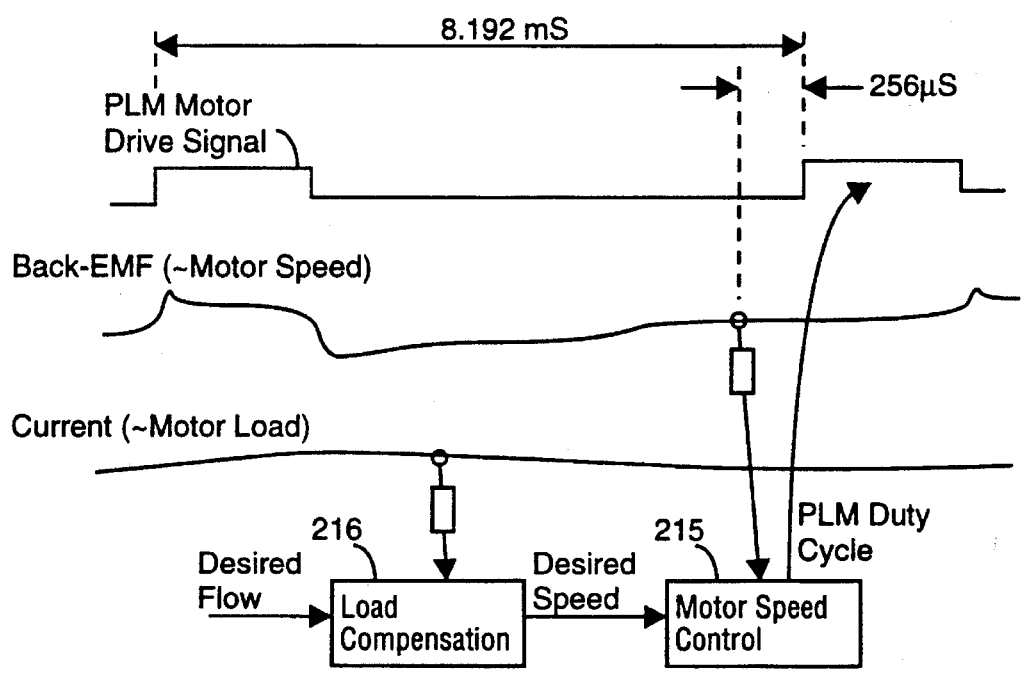
FIG. 6 is a timing diagram showing the sequence of flow control steps used in the dual control loop embodiment of the present invention.

FIG. 6 is a timing diagram showing the timing relationship between the measurement of motor signals, the motor drive signals, and the software implementing the dual loop control algorithm. When the PLM motor drive signal is high in FIG. 6, the motor is receiving power that causes acceleration. When the motor drive signal is low the motor receives no power and coasts. The back-EMF waveform represents the back-emf of the motor driven by the PLM motor drive signal. The current sense waveform shows the current through the motor driven by the PLM motor drive signal.

Motor current and back-emf measurement timing is linked to the motor drive timing because the back-emf must be sensed at the end of the drive interval just before the "on" portion of the drive waveform begins. The current measurements are made near the middle of the PLM drive cycle. The PLM motor drive signal is turned on and off according to the output of the controller timer. That same timer is used to signal the controller software to measure current and back-emf, thereby insuring that there is a precise relationship between the PLM drive signal and the motor signal measurement points.

The motor current signal is read shortly after the motor drive signal is turned off. The load compensation routine 216 then executes and calculates a speed command value for use by the first control loop routine. The timer is programmed to cause a back-emf read a specified time before the start of the next PLM drive cycle. The speed control routine 215 is executed after the back-emf has been measured to calculate a new duty cycle value for the PLM drive signal that will be used by a counter to control the "on" portion of the subsequent PLM duty cycle.

Figure 7:
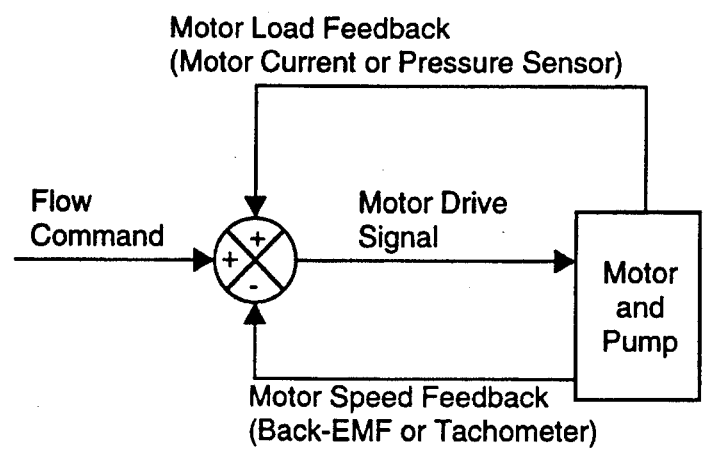
FIG. 7 is a flow chart for an alternate control method to maintain a constant flow through a pump.

FIG. 7 shows the flow of an alternative method of controlling the motor using only a single control loop. The controller implements a signal feed back loop to control motor speed. The controller uses a specified speed command value that is the target motor speed. It gets a signal from the motor, motor current that is proportional to the load on the motor. The controller uses the motor current and speed command value to select the duty cycle for the PLM motor drive signal, increasing the duty cycle of the PLM motor drive signal as the load increases.

Controller software implementing a single control loop method has only a single feedback loop that performs both the speed control and load compensation functions. The sequence of instructions in the software routine is similar to the first feedback loop control routine discussed above. In this embodiment, however, the specified flow command value is used instead of a speed command value as the target motor speed. In addition load compensation is implemented by directly adjusting the PLM duty cycle rather than adjusting the target motor speed. The following pseudocode shows the operation of the controller software implementing this feedback loop:

```
Speed Control with Load Compensation
{
  Receive MotorCurrent
  Receive Back_emf
  error = FlowCommand − Back_emf
  accum = accum + (error * IntegralGain)
  clip accum to predefined range
  temp = (FlowCommand * InitialGain) +
     (error * ProportionalGain) + accum
  if MotorCurrent > Threshold then
     temp = temp + ((MotorCurrent − Threshold) * FlowGain)
  clip temp to predefined range
  PLM duty cycle = temp
}
```

This routine is executed once during each PLM cycle after motor current and back-emf have been measured.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A flow-metered pumping system for regulating the flow of liquid cleaning chemicals to at least one automated cleaning system each said automated cleaning system having an inlet for receiving said liquid cleaning chemicals, said flow-metered pumping system comprising:

at least one flow-metering unit, each of which includes:

at least one air-backed diaphragm pump for pumping said liquid cleaning chemicals into said inlet of each of a group of said automated cleaning systems associated with said flow metering unit, each said pump including:

a pump motor for driving said pump, said pump motor including a motor driver for supplying power to said pump motor;

a speed sensor, coupled to said pump motor, for generating a speed signal corresponding to pump motor speed; and a load sensor, coupled to said pump motor, for generating a load signal corresponding to pump motor load;

a speed controller, coupled to said motor driver and to said speed sensor of said at least one air-backed diaphragm pump, for maintaining said pump motor speed at a specified speed command value; said speed controller including negative feedback for modulating the amount of power supplied by said motor driver to said pump motor according to said speed signal and said specified speed command value; and a speed compensator, coupled to said speed controller and to said load sensor of said at least one pump, for maintaining a substantially constant flow rate of said liquid cleaner chemical through said at least one pump; said speed compensator including positive feedback for adjusting said specified speed command value according to said load signal and a specified base speed.

2. The flow-metered pumping system of claim 1, wherein said speed controller and said speed compensator modulate said amount of power supplied by said motor driver and adjust said specified speed command value, respectively, multiple times within any 0.3 second period.

3. The flow-metered pumping system of claim 1, wherein said speed compensator adjusts said specified speed command value in accordance with the following equation:

Specified Speed Command Value=Base Speed+(PumpLoad−Threshold)*FlowGain when said pump motor load on said pump exceeds said Threshold, where PumpLoad is a pump motor load value corresponding to said load signal, Threshold is a predefined pump motor load threshold value and FlowGain is a predefined positive feedback gain value.

4. The flow-metered pumping system of claim 1, wherein:

said pump motor consists of a permanent magnet DC motor;

said load signal corresponds to pump motor current.

5. The flow-metered pumping system of claim 1, wherein:

said pump motor consists of a pulsed activation, permanent magnet DC motor;

said speed signal corresponds to pump motor back-emf.

6. The flow-metered pumping system of claim 1, wherein:

said pump motor consists of a pulsed activation, permanent magnet DC motor;

said load signal corresponds to pump motor current; and said speed signal corresponds to pump motor back-emf.

7. A method of regulating the flow of liquid cleaning chemicals to at least one automated cleaning system, each said automated cleaning system having an inlet for receiving said liquid cleaning chemicals, said method comprising the steps of:

providing at least one flow-metering unit, each of which includes:

at least one air-backed diaphragm pump for pumping said liquid cleaning chemicals into said inlet of each of a group of said automated cleaning systems associated with said flow metering unit, each said pump including:

a pump motor for driving said pump, said pump motor including a motor driver for supplying power to said pump motor;

a speed sensor, coupled to said pump motor, for generating a speed signal corresponding to pump motor speed; and a load sensor, coupled to said pump motor, for generating a load signal corresponding to pump motor load;

measuring pump motor speed and generating said speed signal;

measuring pump motor load and generating said load signal;

maintaining said pump motor speed at a specified speed command value, including modulating the amount of power supplied by said motor driver to said pump motor according to said speed signal and said specified speed command value using negative feedback; and maintaining a substantially constant flow rate of said liquid cleaner chemical through said at least one pump, including adjusting said specified speed command value according to said load signal and a specified base speed using positive feedback.

8. The method of claim 7, wherein said step of maintaining a substantially constant flow rate includes adjusting said specified speed command value in accordance with the following equation:

$$\text{Specified Speed Command Value} = \text{Base Speed} + (\text{PumpLoad} - \text{Threshold}) * \text{FlowGain}$$

when said load on said pump motor exceeds said Threshold, where PumpLoad is said measured pump motor's load, Threshold is a predefined load threshold value and FlowGain is a predefined positive feedback gain value.

9. The method of claim 7, wherein:

said pump motor consisting of a pulsed activation, permanent magnet DC motor;

said load measuring step including measuring pump motor current;

said speed measuring step including measuring pump motor back-emf.

10. The flow-metered pumping method of claim 7, wherein said maintaining steps are performed multiple times within any 0.3 second period.

* * * * *